March 13, 1956  S. JERKÁS  2,738,180
MELTING FURNACES FOR METALS WITH LOW MELTING POINT
Filed Sept. 23, 1952
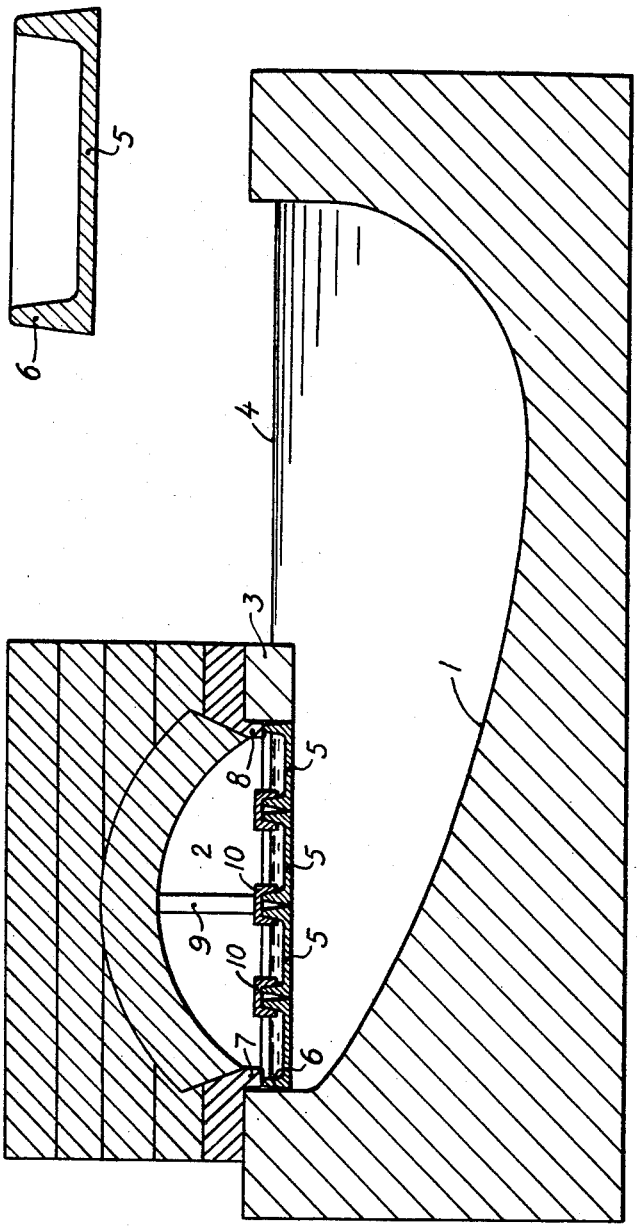
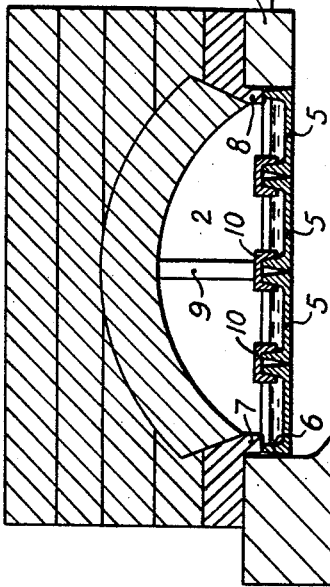
INVENTOR
Sven Jerkas
By: Watson, Cole, Grindle & Watson
ATTORNEYS United States Patent Office 2,738,180
Patented Mar. 13, 1956

2,738,180

MELTING FURNACES FOR METALS WITH LOW MELTING POINT

Sven Jerkas, Fredrikstad, Norway

Application September 23, 1952, Serial No. 311,009

Claims priority, application Norway February 20, 1952

6 Claims. (Cl. 263—11)

The present invention relates to melting furnaces for zinc or other metals with low melting point. More specifically this invention concerns a melting furnace consisting essentially of a heating chamber arranged above a melting container. The sides of the heating chamber extend downward into the melting container to a level somewhat below the normal level of the molten metal within. One or more slabs or screens of heat resistant metal are arranged to float on the molten metal just below the heating chamber. These slabs prevent the entrance of gases and molten metal into the heating chamber from the melting container. The sides of the melting furnace are provided with projections for the purpose of engaging these slabs or screens.

It has been found that no satisfactory tightening for the gases and metal splashes between the heating chamber and the working room of the furnace has been obtained in these known melting furnaces, but that gases may flow through the covering layer floating on the metal and into the heating chamber.

According to the invention, this drawback is removed thereby that the walls of the heating chamber and contingently the roof of the same are provided with projections against the lower edges of which the plate or plates floating on the metal abut when the level of the molten metal in the working space is so high that the plate or the plates come into level with the projections. Hereby a safe tightening is obtained along the edges of the plates.

The plate or each plate or section preferably has inwardly inclined side edges so that wedge shaped spaces which may be tightened with a filling of glaze or other suitable material is formed between the edges of the outmost plates and the walls of the furnace and between adjacent plates.

Each plate is preferably provided with upwardly extending flanges or lists which correspond to the said projecting parts of the walls or roof of the heating chamber. These high flanges render it possible to make the plate itself comparatively thin which is an advantage in heat transmission. Moreover the flanges present a convenient connection between adjacent plates or sections. Such a connection may be made by means of clips or the like.

The fact that the plates abut against fixed stop faces also brings the advantage that oxides and other impurities formed on the under sides of the plates during the melting or galvanizing process and which reduce the heat transmission may be removed by means of scrapers. For such cleaning of the plates it has hitherto been necessary to lift the heating chamber and remove the plates. As the level of the molten metal in the melting container approaches normal level the slab of heat resistant material adapted to float on the molten metal also rises until the underside of this slab is approximately level with the underside of the heating chamber walls which extend downward into the melting container. In this position the underside of both the downwardly projecting heating container wall and the heat resistant slab may be more easily cleaned.

The drawing illustrates as an example an embodiment of the melting furnace according to the invention.

Figure 1 is a vertical section through the furnace, and,
Figure 2 is a section of a plate with upwardly extending flanges along its edges.

In the drawing 1 indicates the melting or working space of the furnace, and 2 the heating chamber which is closed against the external atmosphere thereby that the wall 3 of the chamber is extended somewhat down below the surface 4 of the molten metal in the melting space. 5, 5 are plates of heat resisting material floating on the molten metal and constituting partition between the working space 1 and the heating chamber 2. Each plate is along its edges provided with upwardly extending lists or flanges 6 with the outer sides inclined somewhat inwardly, so that wedge shaped spaces which may be filled with glazing or the like for tightening are formed between the plate and the wall of the furnace or between adjacent plates. Adjacent plates may be secured in position by means of the clips or clamps 10 clamping the flanges 6 of adjacent plates together.

The walls of the heating chamber are provided with projections 7, 8 against the lower edges of which the plates floating on the molten metal abut so as to secure tightening when the level of the metal reaches the adequate height. Besides the said projections on the walls, partitions or pillars 9 secured to the roof of the chamber may be provided, the lower ends of which abut against the upper sides of adjacent plates or against the clips 10 keeping the plates together. In case the said projections from the roof of the chamber are made in the form of partitions, they may serve to divide the chamber into two or more channels communicating one with the other at one of the end walls of the chamber, the downwardly extending partition not being carried fully to the end wall. Especially with oil or gas heating the elongation of the combustion channels hereby obtained ensures a considerably improved utilisation of the heat.

I claim:

1. A melting furnace for metals of low melting point, comprising an upwardly open melting container and a vault like heating chamber arranged above at least a part of the said container and having sides extending downwardly below the normal level of the molten metal in the said melting container, and at least one slab of heat resistant material adapted to float on the molten metal within the sides of the said vault, the sides of the said vault being provided with projections the lower faces of which are adapted to be engaged by the top face of the said floating slabs.

2. A melting furnace as claimed in claim 1, wherein essentially downwardly extending members are provided in the roof portion of the said vault like heating chamber, the lower portion of each such member being adapted to engage the top surface of at least one of the said floating slabs.

3. A melting furnace as claimed in claim 1, wherein essentially downwardly extending members are provided in the roof portion of the said vault like heating chamber, the lower portion of each such member being adapted to engage the top surface of at least one clamping member serving to interconnect at least two adjacent floating slabs.

4. A melting furnace as claimed in claim 1, wherein each floating slab is provided with side faces having a slight inward inclination from the bottom to the top face of the slab.

5. A melting furnace as claimed in claim 1 wherein each floating slab is of a substantially U-shaped vertical section.

6. A melting furnace as claimed in claim 1 and provided with downwardly extending members from the roof portion of the said vault like heating chamber, the lower portion of each such member being adapted to engage the top surface of at least one of the said floating slabs, the total width of the said members being less than the total width of the slab surface engaged by the same.

References Cited in the file of this patent

UNITED STATES PATENTS

| | | |
|---|---|---|
| 1,145,685 | Johansson | July 6, 1915 |
| 1,522,765 | Wilke | Jan. 13, 1925 |
| 1,567,219 | Williams | Dec. 29, 1925 |
| 1,672,142 | Rabate | June 5, 1928 |
| 1,961,063 | Miguet et al. | May 29, 1934 |

FOREIGN PATENTS

| | | |
|---|---|---|
| 395,766 | Great Britain | July 27, 1933 |